United States Patent
Ling et al.

(10) Patent No.: US 7,585,126 B2
(45) Date of Patent: Sep. 8, 2009

(54) SCREWLESS FIXING ASSEMBLY

(75) Inventors: Miao Hung Ling, Chung-Ho (TW); Han Ying Zheng, HuiZhou (CN)

(73) Assignee: Cooler Master Co., Ltd., Taipei County (TW)

( * ) Notice: Subject to any disclaimer, the term of this patent is extended or adjusted under 35 U.S.C. 154(b) by 316 days.

(21) Appl. No.: 11/806,758

(22) Filed: Jun. 4, 2007

(65) Prior Publication Data

US 2008/0298928 A1 Dec. 4, 2008

(51) Int. Cl.
*B25G 3/28* (2006.01)
(52) U.S. Cl. ............... 403/359.4; 403/109.3; 403/166; 403/325; 403/328; 403/348
(58) Field of Classification Search ............ 403/109.3, 403/166, 324, 325–328, 348–349, 359.3, 403/359.4; 401/194, 195; 361/679.33
See application file for complete search history.

(56) References Cited

U.S. PATENT DOCUMENTS

| | | | | |
|---|---|---|---|---|
| 4,968,168 A | * | 11/1990 | Chern | 401/194 |
| 6,270,274 B1 | * | 8/2001 | Chao | 401/195 |
| 6,304,457 B1 | * | 10/2001 | Liu et al. | 361/679.33 |
| 6,623,136 B1 | * | 9/2003 | Kuo | 401/195 |
| 6,719,473 B1 | * | 4/2004 | Kao | 401/195 |
| 6,721,135 B2 | * | 4/2004 | Hong et al. | 360/264.2 |
| 6,762,932 B2 | * | 7/2004 | Regimbal et al. | 361/679.33 |
| 2006/0002078 A1 | * | 1/2006 | Jing | 361/685 |
| 2006/0261604 A1 | * | 11/2006 | Ya et al. | 292/218 |

FOREIGN PATENT DOCUMENTS

TW M294813 7/2006

* cited by examiner

*Primary Examiner*—Victor MacArthur
(74) *Attorney, Agent, or Firm*—Rabin & Berdo, P.C.

(57) ABSTRACT

A screwless fixing assembly disposed on a frame is provided, which includes a fixed member, a movable member, an elastic member, and a positioning device. The fixed member is fixed on the frame and has an opening form thereon. The movable member is movably disposed to the fixed member and has a pin to pass through a through hole of the frame. The elastic member is provided for pushing the movable member to move away from the frame. The positioning device is disposed on the movable member and protrudes on the fixed member through the opening, for being selectively engaged with the fixed member at a first position and a second position, so as to move the pin to leave or inserted into the through hole. An electronic device is fixed on the other side of the frame by the pin passing through the through hole.

1 Claim, 8 Drawing Sheets

SCREWLESS FIXING ASSEMBLY

BACKGROUND OF THE INVENTION

1. Field of Invention

The present invention relates to a fixing assembly for fixing an electronic peripheral in a computer case, and more particularly to a screwless fixing assembly that is reliable, and fixes the electronic peripheral without use of screws.

2. Related Art

In the prior art, a data storage device in a computer, such as an optical disc drive or a hard disk drive, or a case element is fixed by screws. Tightening and loosing the screws are time consuming. If an electronic device within the computer case is malfunctioned or requires to be replaced after the computer is provided to a user, the user has to spend a lot of time in tightening and loosing the screws for fixing the electronic peripheral, and that is quite inconvenient for the user. Furthermore, after being loosened, the screws are often lost due to the negligence of the user, with a result that the electronic device cannot be well fixed to the computer case by the screws, and that is a trouble to the user.

For example, Taiwan Utility Model M294813 provides a fixing structure in a computer case, for fixing a data storage device to the computer case. M294813 includes a handle, a fixing member, and a fixed pillar. The handle has a gripped portion and an accommodating space defined therein. The fixing member is disposed in the accommodating space of the handle. The fixing member has a post and a slot, the post are disposed at one side of the fixing member adjacent to the computer case. The fixed pillar passes through the slot to enter the accommodating space of the handle, and one end of the fixed pillar is fixed to the computer case. A spring slips on the fixed pillar to press the other end of the fixed pillar and the fixing member, so as to push the fixing member towards the computer case. When the handle is pulled and then moved in a direction parallel to the surface of the computer case, the fixing member is sequentially moved together with the handle, such that the post of the fixing member is moved backward to leave a through hole on the computer case and rest on the surface of the computer case. When a data storage device having at least one screw hole is placed in the computer case, the he fixing member can be moved reversely together with the handle. Then, the post of fixing member is moved to the through hole of the computer case. Because the spring pushes the fixing member towards the computer case, the post of the fixing member passes through the through hole and inserts the screws hole of the data storage device, such that the data storage device is fixed in the computer case.

In M294813, the data storage device utilizes the spring to exert force on the fixing member to insert into the screw hole, and screws utilized in the prior art are not required in M249813 for fixing the data storage device. The time for tightening or loosing screws is saved. In the M294813, the handle has to be pulled and moved manually in two directions, so as to pull the post of the fixing member out from the screw hole and let the post rest on the surface of the computer case. However, if the force generated by the spring and exerted on the fixing member is too large, it is difficult for the user to pull the post of the fixing member out. On the contrary, if the force generated by the spring and exerted on the fixing member is too small, the post might easily fall out from the screw hole due to vibration. Furthermore, when the post of the fixing member rests on the surface of the computer case, it is still pushed by the spring; such an force exerted on the post may easily damage the fixing member or the post.

SUMMARY OF THE INVENTION

In view of the above problems, the object of the present invention is to provide an screwless fixing assembly for rapidly fixing an electronic peripheral in the computer case without the use of screws. The screwless fixing assembly is operated by one single step to fix or release the electronic peripheral, thereby significantly simplifying the operation of fixing and releasing the electronic peripheral.

In order to achieve the aforementioned object, a screwless fixing assembly of present invention is provided, which is disposed on a frame of the computer case. The screwless fixing assembly includes a fixed member, a movable member, at least one pin, an elastic member, and a positioning device. The fixed member is fixed on the frame and has an opening formed thereon. The movable member is movably disposed to the fixed member, and the pin is fixed on the movable member to pass through a through hole of the frame. The elastic member is disposed between the frame and the movable member for pushing the movable member away from the frame. The positioning device is disposed on the movable member and protrudes from the fixed member through the opening. The positioning device is selectively engaged with the fixed member at a first position and a second position. When the positioning device is at the first position, the movable member is moved away from the frame by the elastic member, such that the pin leaves the through hole. When the positioning device is at the second position, the positioning device moves the movable member to approach the frame, such that the pin passes through the through hole. Therefore, an electronic peripheral can be fixed on the other side of the frame by the pin passing through the through hole and inserting into the electronic peripheral.

The advantage of the present invention is that the screwless fixing assembly of the present invention utilizes elastic member to move the movable member and the pin to be released from the electronic peripheral, and the screwless fixing assembly is operated by one single step to fix or release the electronic peripheral, so as to save the time spent in tightening and loosing screws in the prior art. Furthermore, the elastic member is provided for pushing the moveable member and pin away frame the fixed member (also away from the frame), such that the surface of the frame will not damaged by the pin. Moreover, when the pin inserts into the screw hole of the electronic peripheral, the pin is fixed through the positioning device engaged with the fixed member, instead of the pushing force of a spring, such that the pin is firmly fixed in the screw hole of the electronic peripheral. That is the pin is prevented from falling out from the screw hole due vibration.

The above description of the content of the present invention and the following illustration of the embodiments are intended to demonstrate and explain the principle of the present invention and to provide further explanations of the claims of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

In order to further understand the objects, structures, features, and functions of the present invention, embodiments will be illustrates as follows.

Figure 1A:
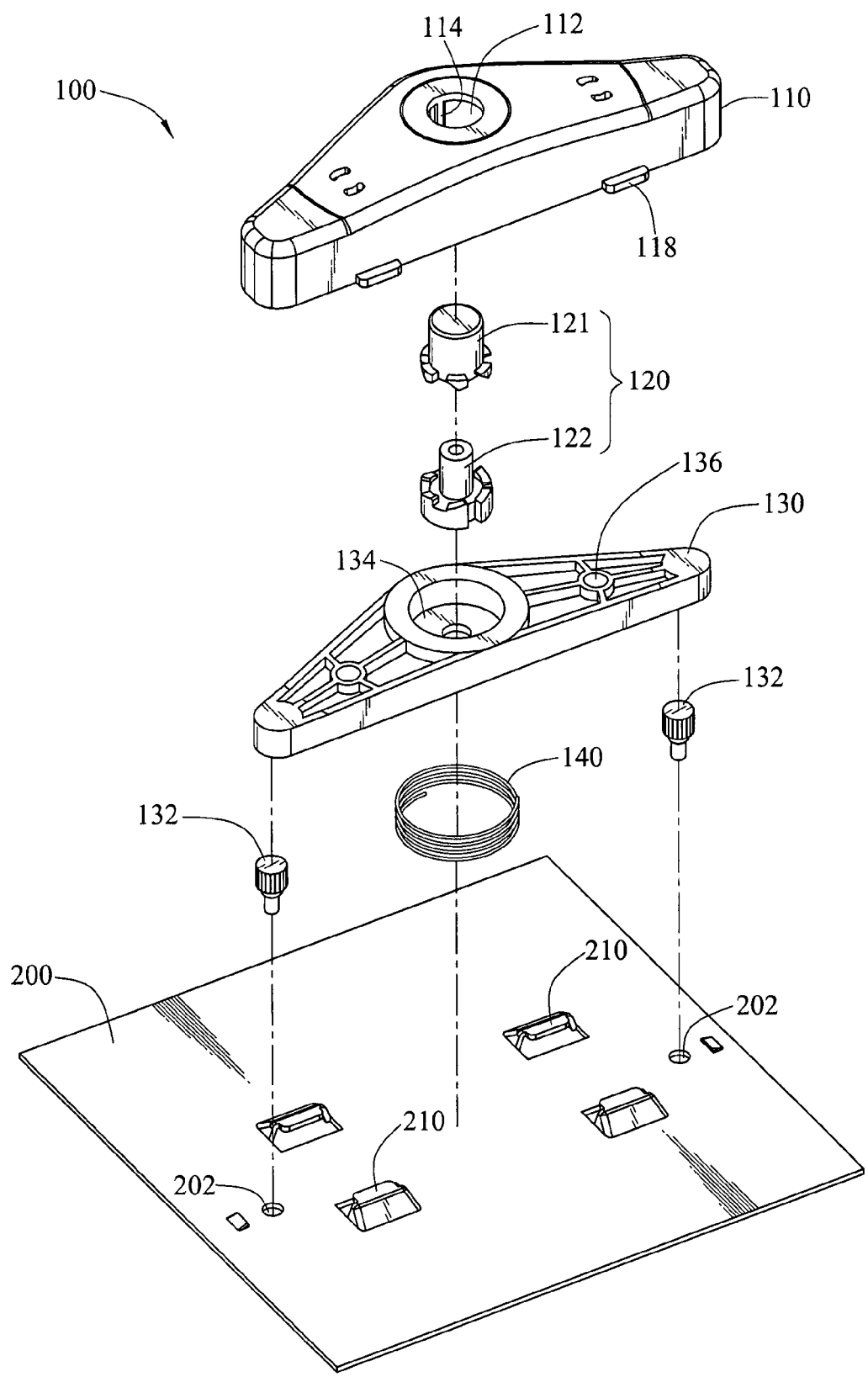
FIG. 1A is a exploded view of the screwless fixing assembly according to an embodiment of the present invention.
Figure 2A:
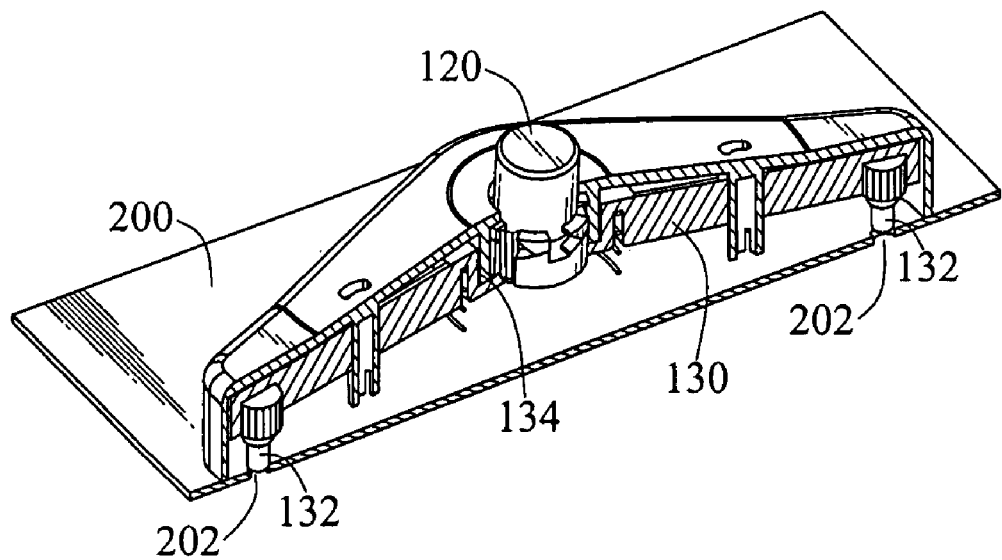
FIG. 2A is a partial sectional view of the screwless fixing assembly according to the present invention when releasing the electronic peripheral.

Referring to FIGS. 1A and 2A, a screwless fixing assembly according to an embodiment of the present invention is provided, which is disposed on an outer side a frame 200 to fix an electronic peripheral disposed on the frame 200, such as an optical disk drive or a hard disk drive. The frame 200 has a plurality of through holes 202 corresponding to a plurality of screw holes of the electronic peripheral. The screwless fixing assembly 100 includes a fixed member 110, a positioning device 120, a movable member 130, and an elastic member 140.

Referring to FIGS. 1A and 2A, the fixed member 110 is fixed on the outer side of the frame 200. The fixed member 110 is a cover and has an accommodation space 111 formed therein. The fixed member 110 further has an opening 112, at least one limited post 114, two guided pillars 116, and four latching elements 118. The opening 112 is used for communicating the outside of the fixed member 110 and the accommodating space 111 defined therein. The limited post 114 is disposed inside the fixed member 110 to be located in the accommodating space 111 and adjacent to the edge of the opening 112. The guided pillar 116 is formed inside the fixed member 110 and vertically extends toward the outside of the accommodation space 111. The latching elements 118 formed on the edge of the fixed member 110, and is disposed corresponding to fixed hooks 210 of the frame 200, such that the fixed member 110 is fixed to the frame 200 by being engaged with the fixed hooks 210.

Referring to FIGS. 1A and 2A again, the movable member 130 is movably disposed in the accommodation space 111 of the fixed member 110, and the movable member 130 has a depression 134 and two guide holes 136. The depression 134 is formed on the movable member 130 and corresponding to the opening 112, and the guide holes 136 are disposed corresponding to the guided pillars 116. When the movable member 130 is placed in the accommodation space 111 of the fixed member 110, the guided pillars 116 of the fixed member 110 pass through the guide holes 136, so as to guide the movable member 130 to move in the accommodation space 111 along a first direction. The opening 112 of the fixed member 110 is located above the depression 134. In this embodiment, the first direction refers to the direction perpendicular to the surface of the frame 200, i.e., the movable member 130 is limited to move in the direction close to or away from the surface of the frame 200.

Furthermore, the screwless fixing assembly further includes two pins 132 fixed on two ends of the movable member 130. When the movable member 130 approaches the frame 200, the pins 132 pass through the through holes 202 of frame 200, and then insert into the screw holes of the electronic peripheral on the other side of the frame 200, so as to fix the electronic peripheral. The pins 132 are independent elements to be embedded in the movable member 130, or directly formed on the movable member 130 monolithically.

Referring to FIGS. 1A and 2A again, the elastic member 140 is disposed between the frame 200 and the movable member 130, for pushing the movable member 130 to move away from the frame 200 along the first direction. In this embodiment, the elastic member 140 is a compression spring.

Figure 2B:
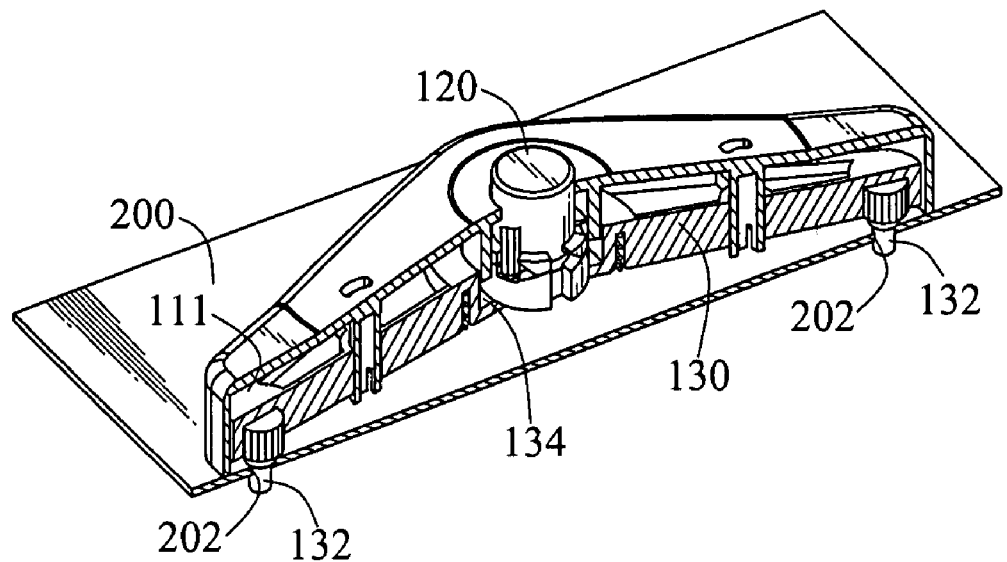
FIG. 2B is a partial sectional view of the screwless fixing assembly according to the present invention when fixing the electronic peripheral.

Referring to FIGS. 2A and 2B, the positioning device 120 is disposed in the depression 134 of the movable member 130, and protrudes from the fixed member 110 through the opening 112 of the fixed member 110. The positioning device 120 is selectively engaged with the fixed member 110 at a first position and a second position. When the positioning device 120 is engaged with the fixed member 110 at the first position, the movable member 130 is moved away from the frame 200 by the elastic member 140, such that the pins 132 leave the through holes 202. When the positioning device 120 is engaged with the fixed member 110 at the second position, the positioning device 120 moves the movable member 130 to approach the frame 200, such that the pins 132 passes through the through holes 202 to insert into the corresponding screw hole of the electronic peripheral on the other side of the frame 200.

Figure 1B:
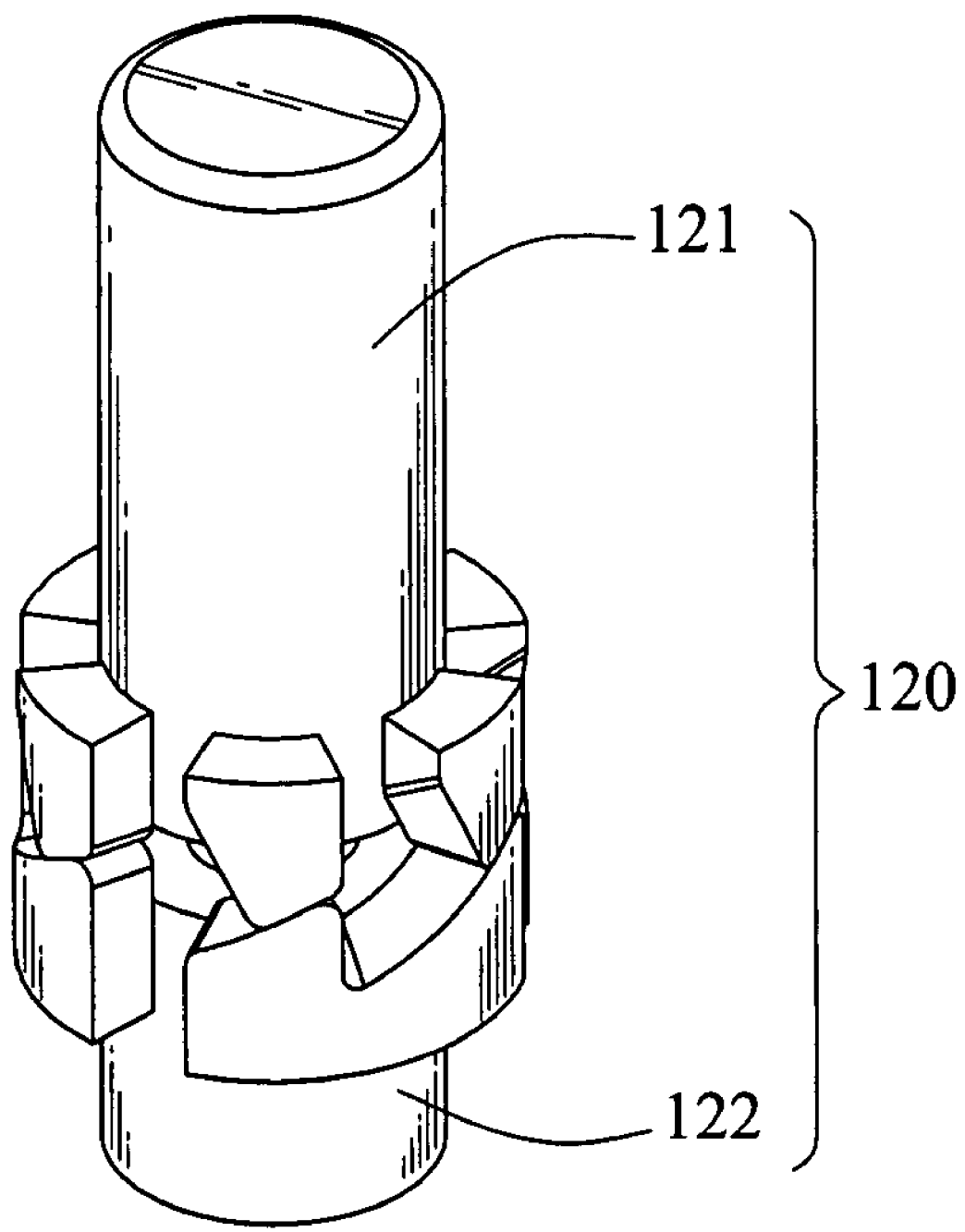
FIG. 1B is an enlarged perspective view of the positioning device of the screwless fixing assembly according to the embodiment of the present invention.

Referring to FIGS. 1A, 1B, and 2B, the positioning device 120 includes a mandrel 122 and a pressed cap 121. The mandrel 122 of the positioning device 120 slips on the depression 134 of the movable member 130, and the pressed cap 121 is movably disposed on the mandrel 122 and protrudes from the fixed member 110 through the opening 112.

Then, referring to FIGS. 1A and 1B, the mandrel 122 has a plurality of first grooves 1221, a plurality of second grooves 1222, and a plurality of second positioning bevels 1223 formed thereon. The first grooves 1221 and the second grooves 1222 are recessed to different depths, formed on the periphery of the mandrel 122, and arranged at intervals. The second positioning bevels 1223 are formed between the first grooves 1221 and the second grooves 1222. The pressed cap 121 has a plurality of sliding blocks 1211 formed on the side of the pressed cap 121, and each of the sliding blocks 1211 has a first bevel 1212 formed on the bottom thereof. The first bevel 1212 of the sliding blocks 1211 is used to contact and slide on the second positioning bevels 1223 of the mandrel 122, so as to convert the displacement of the pressed cap 121 toward the mandrel 122 into a slippage of the first bevel 1212 and the second positioning bevel 1223, and then make the mandrel 122 rotates with respect to the pressed cap 121.

Figure 3A:
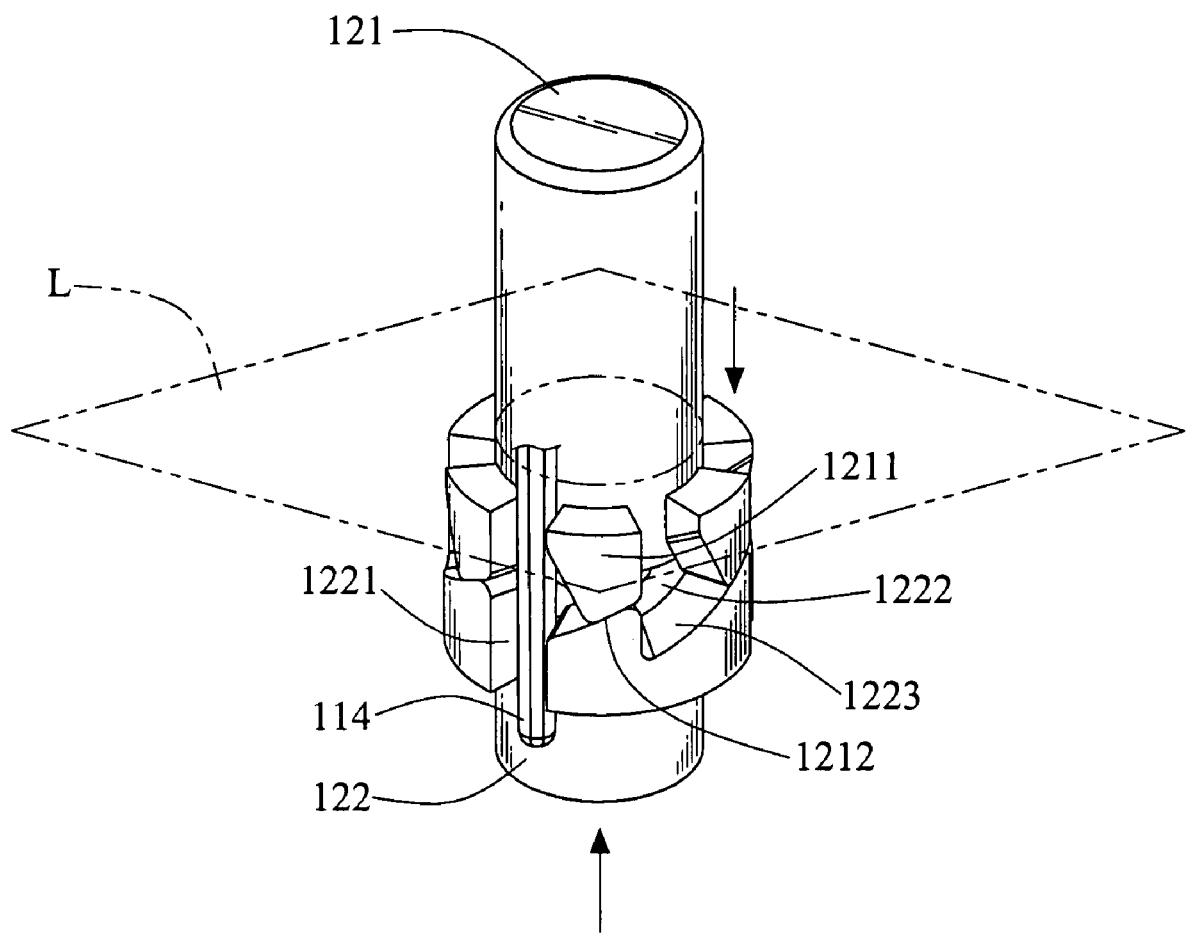
FIGS. 3A to 3E are schematic views of the fractional steps of the screwless fixing assembly according to the present invention.

Referring to FIG. 3A, when the limited post 114 is engaged into the first grooves 1221 of the mandrel 122, the movable member 130 is pushed by the elastic member 140 to be at the first position, the positioning device 120 protrudes through the opening 112, and the pins 130 are pulled back in the accommodation space 111, thereby releasing the electronic peripheral.

Figure 3B:
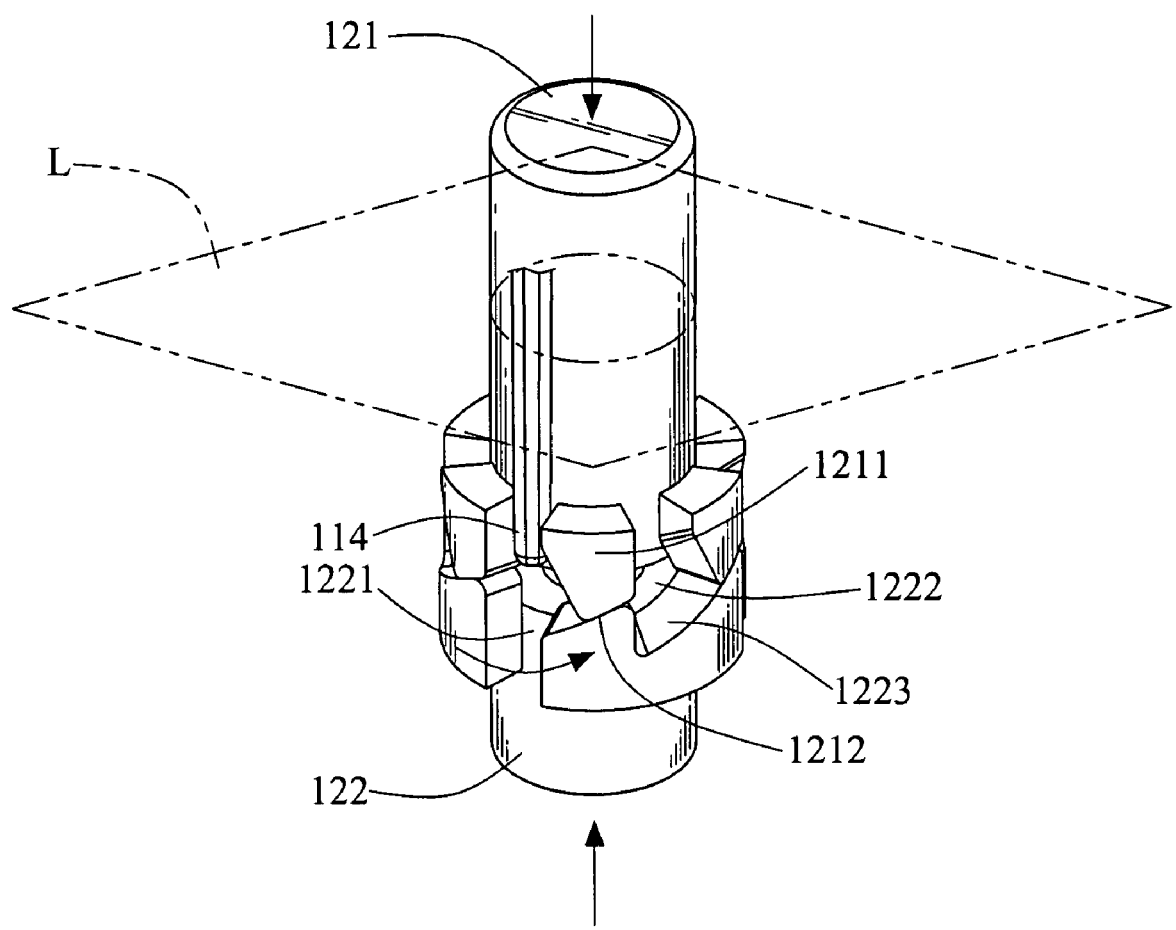

Referring to FIG. 3B, when the pressed cap 121 is pressed to move the movable member 130 to compress the elastic member 140, the limited post 114 leaves the first grooves 1221. When the limited post 114 leaves the first grooves 1221, the mandrel 122 rotates with respect to the pressed cap 121 by a specific angle through the slippage of the first bevel 1212 and the second positioning bevel 1223.

Figure 3C:
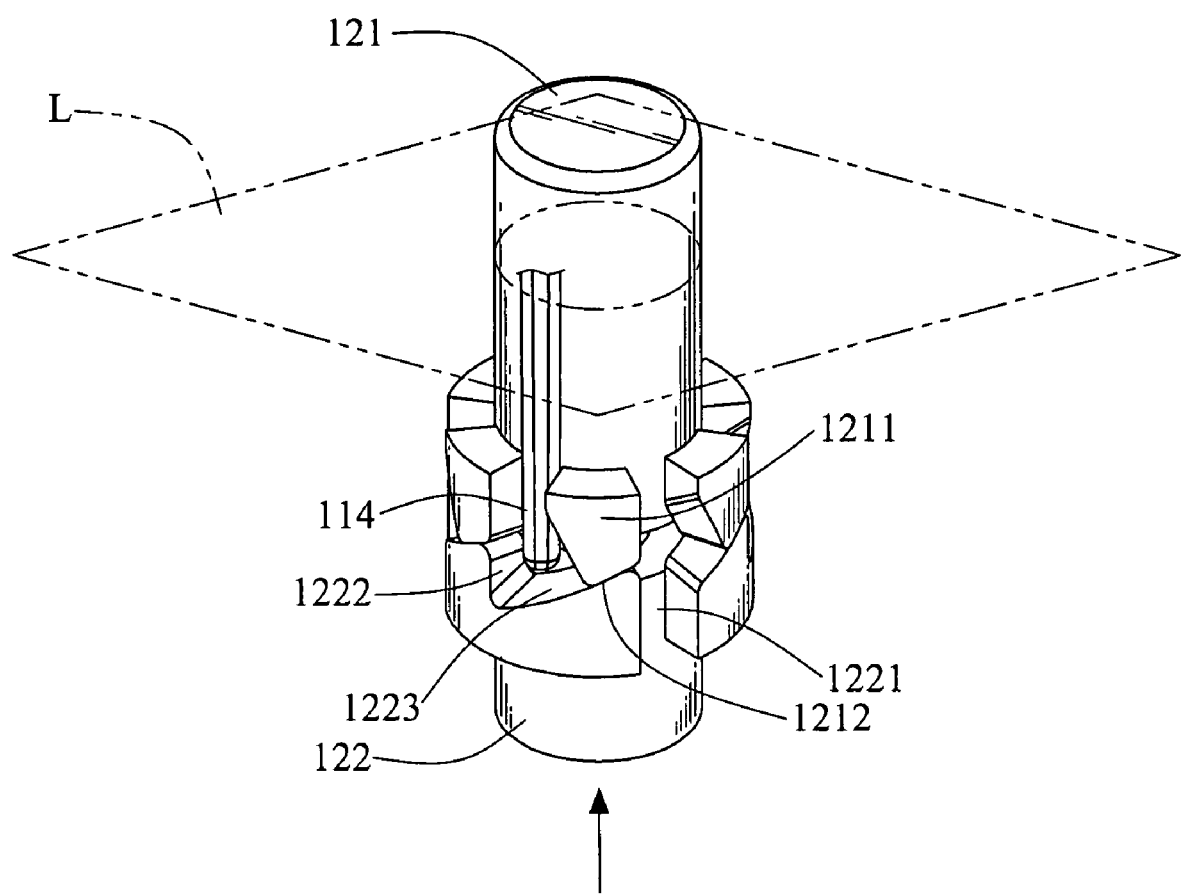

As shown in FIG. 3C, if the external force exerted on the pressed cap 121 is removed, the movable member 130 and positioning device 130 is pushed upward by the elastic member 140, so that the limited post 114 is engaged into the second bevels 1223 of the mandrel 122, and then slide to be engaged into the second grooves 1222, thus the movable member 130 is located at the second position. The pins 130 pass through the through holes 202 of the frame 200, so as to fix the electronic peripheral.

Figure 3D:
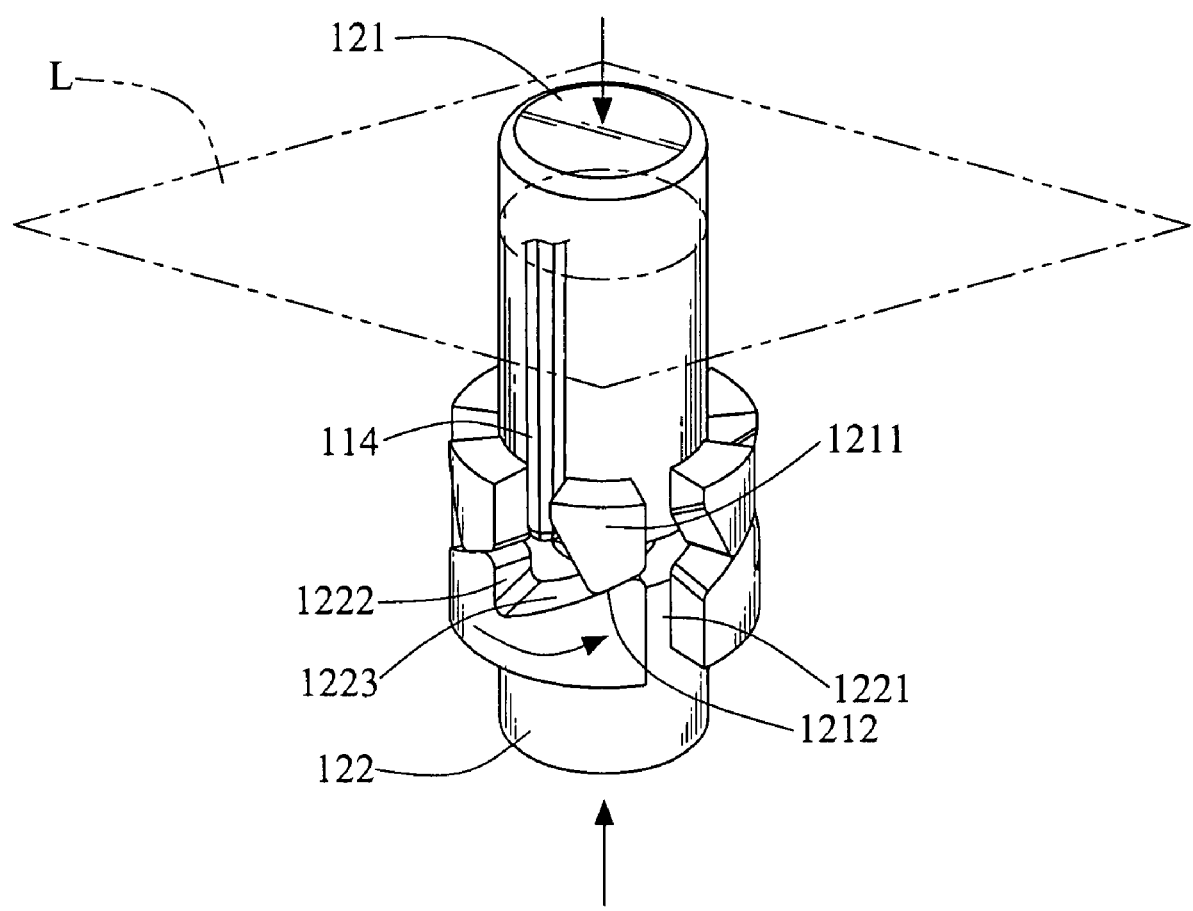
Figure 3E:
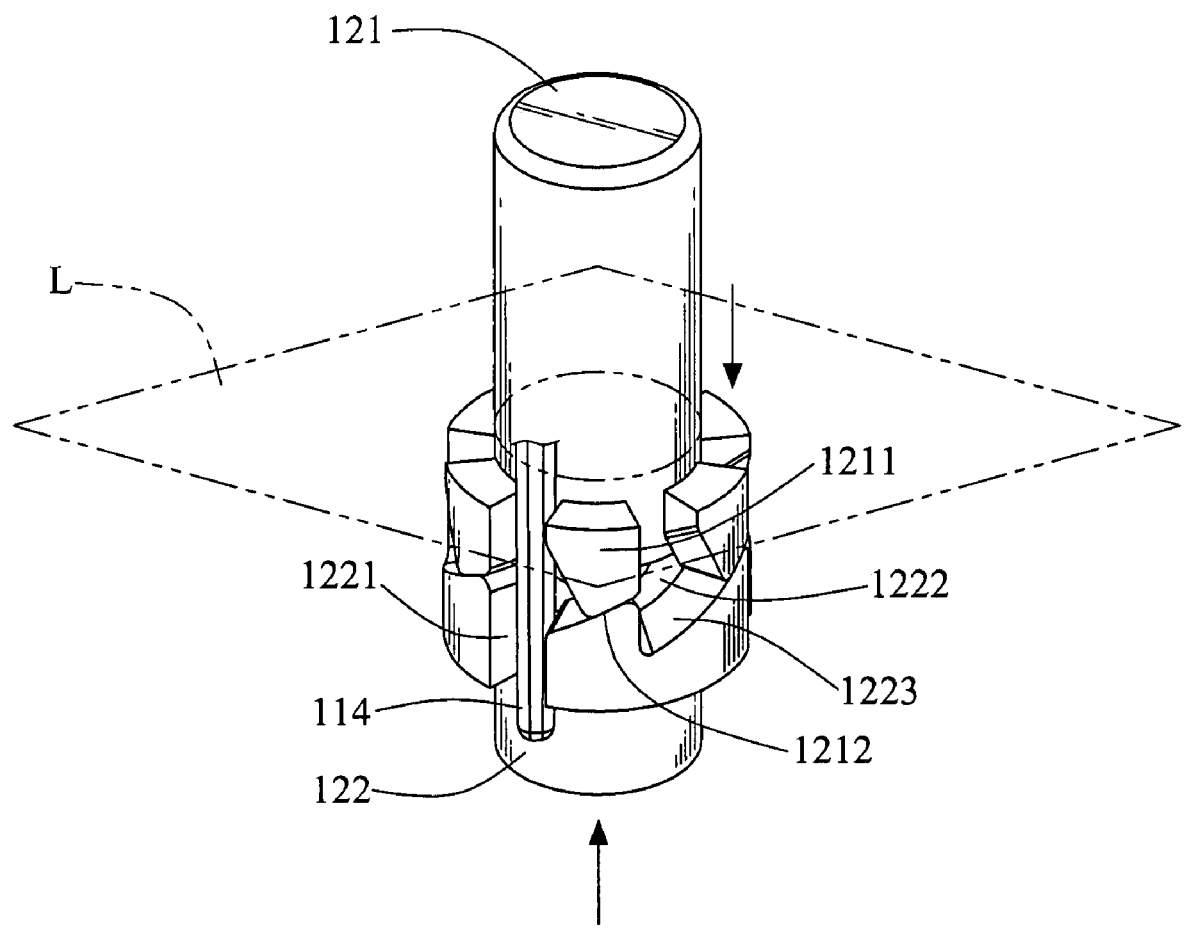

As shown in FIGS. 3D and 3E, when a user presses the pressed cap 121 again, the limited post 114 leaves the second grooves 1222, the mandrel 122 also rotates with respect to the pressed cap 121. Then, if the external force is removed, the limited post 114 is again engaged into the first grooves 1221, so as to release the movable member 130, as shown in FIG. 3E.

In FIGS. 3A to 3E, a reference plane L is marked and is, for example, a plane parallel to the top of the fixed member 110. It can be clearly seen from the reference plane L that the pressed cap 121 of the positioning device 120 are in different heights corresponding to the fixed member 110 or the opening 112 when being in different positions. Furthermore, in this embodiment, the quantity of the first grooves 1221 and the second grooves 1222 cannot be less than the quantity of the limited posts 114, such that the screwless fixing assembly 100 may operate normally.

The screwless fixing assembly of the present invention achieves the purpose of fixing and releasing the electronic peripherals by utilizing an elastic member to move the movable member and the pin to be released from the electronic peripheral, and the screwless fixing assembly is operated by one single step to fix or release the electronic peripheral, so as to save the time spent in tightening and loosing screws in the prior art. Furthermore, the elastic member is provided for pushing the moveable member and pin away frame the fixed member (also away from the frame), such that the surface of the frame will not damaged by the pin. Moreover, when the pin inserts into the screw hole of the electronic peripheral, the pin is fixed through the positioning device engaged with the fixed member, instead of the pushing force of a spring, such that the pin is firmly fixed in the screw hole of the electronic peripheral. That is the pin is prevented from falling out from the screw hole due vibration.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A screwless fixing assembly disposed on a flat plate frame having a plurality of fixed hooks on a first side and a plurality of through holes extending through to an opposite side, the fixing assembly comprising:
   a fixed cover member having an opening extending therethrough, a plurality of latching elements fixed within said hooks, a plurality of pillars, and at least one limited post formed in the opening;
   a movable member being disposed within the fixed cover member, and having a depression, a plurality of guide holes receiving the pillars, and a plurality of pins fixed on the movable member to pass through the through holes;
   an elastic coil spring member, disposed between the frame and the movable member;
   a positioning device having a cylindrical pressed cap disposed through the opening and a mandrel disposed in the recess, the pressed cap having a plurality of sliding blocks with first bevels, the mandrel having a plurality of first grooves, second grooves, and second bevels; the pressed cap, mandrel, opening and depression sharing a common axis of symmetry;
   whereby when the positioning device is in a first position the movable member is biased by the spring against an upper surface of the cover away from the frame with the limited post extending between two of said sliding blocks into one of said second grooves, and when the positioning device is in a second position the movable member is positioned away from the upper surface with the limited post extending between two of said sliding blocks and through one of said first grooves such that the pins extend through the through holes to protrude from the opposite side of the frame; and
   whereby movement between the first and second positions is effected by depressing the cap into the cover to disengage the mandrel from the limited post thereby allowing the mandrel to rotate relative to the cap with the second bevels sliding against the first bevels to selectively align one of the first grooves or one of the second grooves to receive the post upon release of the cap.

* * * * *